(12) United States Patent
Knueven

(10) Patent No.: US 6,620,445 B1
(45) Date of Patent: *Sep. 16, 2003

(54) ALKALI METAL BISULFATES AS ACIDULANTS IN FOOD

(75) Inventor: Carl Joseph Knueven, Bowling Green, OH (US)

(73) Assignee: Jones-Hamilton Co., Newark, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 09/635,821

(22) Filed: Aug. 9, 2000

Related U.S. Application Data

(63) Continuation-in-part of application No. 09/386,241, filed on Aug. 31, 1999, now Pat. No. 6,132,792, which is a continuation-in-part of application No. 09/131,522, filed on Aug. 10, 1998, now Pat. No. 5,958,491.

(51) Int. Cl.$^7$ .................................................. A21D 4/00
(52) U.S. Cl. ...................... 426/321; 426/534; 426/590; 426/654; 426/549
(58) Field of Search ................................ 426/321, 534, 426/654, 549, 590

(56) References Cited

U.S. PATENT DOCUMENTS

| | | | |
|---|---|---|---|
| 4,352,826 A | 10/1982 | Pearline et al. | ............... 426/39 |
| 4,374,152 A | 2/1983 | Loter | ........................... 426/39 |
| 4,959,229 A | 9/1990 | Reddy et al. | .................. 426/39 |
| 5,198,254 A | 3/1993 | Nisperos-Carriedo et al. | ............. 426/102 |
| 5,310,549 A | 5/1994 | Bull | ........................ 424/78.08 |
| 5,773,063 A | 6/1998 | Knueven | ..................... 426/335 |
| 5,958,491 A | 9/1999 | Knueven | ..................... 426/321 |

OTHER PUBLICATIONS

Hawley's Condensed Chemical Dictionary, 12th Ed., pp. 16, 17, 1050 (1993).

"Food Acidulants", Pfizer Technical Information (1981).

*Primary Examiner*—Nina Bhat
(74) *Attorney, Agent, or Firm*—MacMillan, Sobanski & Todd, LLC

(57) ABSTRACT

A method for providing an acidulant effect in a food. A food is prepared including alkali metal bisulfate in an amount effective to act as an acidulant. Moisture is added in an amount effective to dissolve the alkali metal bisulfate. In a preferred embodiment, a leavened baked good is prepared including a baking carbonate, and alkali metal bisulfate in an amount effective to react with the baking carbonate to release carbon dioxide to leaven the baked good. A food composition includes alkali metal bisulfate in an amount effective to act as an acidulant in the food, and moisture in an amount effective to dissolve the alkali metal bisulfate.

10 Claims, No Drawings

ALKALI METAL BISULFATES AS ACIDULANTS IN FOOD

This application is a continuation-in-part of U.S. application Ser. No. 09/386,241, filed Aug. 31, 1999, now U.S. Pat. No. 6,132,792. issued Oct. 17, 2001, which is a continuation-in-part of U.S. application Ser. No. 09/131,522, filed Aug. 10, 1998, now U.S. Pat. No. 5,958,491, issued Sep. 28, 1999.

BACKGROUND OF THE INVENTION

This invention relates in general to acidulants for use in foods, and in particular to the use of alkali metal bisulfates as acidulants in foods.

Acidulants are acids which are added to foods to provide a variety of functions. The major functions are: to enhance the flavor of the foods by imparting a tart, sour taste; to lower pH, thus preventing the growth of bacteria which cause spoilage and food poisoning; and to chelate metal ions such as iron and copper which catalyze rancidity reactions in fats. Commonly used acidulants are citric, acetic, fumaric, ascorbic, propionic, lactic, adipic, malic, sorbic, phosphoric and:tartaric acids. Most of the acidulants are organic acids.

The known acidulants are not always totally satisfactory. For example, the organic acids are relatively weak, so that a relatively large amount of the acid must be used in the food to achieve the desired effect. This can undesirably increase the cost of the food, and can present other disadvantages. Some of the acidulants, such as citric acid and malic acid, are relatively expensive to begin with. Some acidulants are not very soluble in foods. Other acidulants are difficult to handle during food processing because of their corrosive nature. Accordingly, it would be desirable to provide new acidulants for use in foods as an attractive alternative to the known acidulants.

SUMMARY OF THE INVENTION

This invention relates to a method for providing an acidulant effect in a food. The method comprises preparing a food including an alkali metal bisulfate in an amount effective to act as an acidulant in the food, and further including moisture in an amount effective to dissolve the alkali metal bisulfate. In a preferred embodiment, the method comprises preparing a leavened baked good including alkali metal bisulfate as an acidulant in the leavening system. The leavening system includes a baking carbonate and an alkali metal bisulfate in an amount effective to react with the baking carbonate to release carbon dioxide to leaven the baked good. Preferably, the alkali metal bisulfate is included in an amount within a range of from about 0.1% to about 1.0% by weight of the baked good. When used in the leavening system of a baked good, preferably the alkali metal bisulfate is finely ground so that the particles have an average diameter within a range of from about 0.03 millimeter to about 0.2 millimeter. The invention also relates to a food composition including alkali metal bisulfate in an amount effective to act as an acidulant in the food, and further including moisture in an amount effective to dissolve the alkali metal bisulfate.

It was not previously thought to use alkali metal bisulfates as acidulants in foods. Previously, alkali metal bisulfates were used mainly in industrial chemicals and cleaners, in metal finishing, and in other uses much different from acidulants in foods. Alkali metal bisulfates do not come to mind when a person thinks of acids for addition to foods. They do not have an "acid" handle on them. They are not considered in the same class of products as the known acidulants. The majority of the known acidulants are organic acids, which are common ingredients in foods, and which are often naturally occurring in foods. Alkali metal bisulfates are not organic acids. Prior to this invention, sodium bisulfate had not been approved by the Food and Drug Administration for use in foods. Further, it was not evident that alkali metal bisulfates would be desirable for use as acidulants in foods. It is believed that alkali metal bisulfates are the first totally new acidulants in 20 years.

Various objects and advantages of this invention will become apparent to those skilled in the art from the following detailed description of the preferred embodiment.

DETAILED DESCRIPTION OF THE PREFERRED EMBODIMENT

The alkali metal bisulfates for use as acidulants in foods according to this invention include sodium bisulfate, potassium bisulfate, and mixtures thereof. The sodium bisulfate is a sodium salt of sulfuric acid generally expressed as $NaHSO_4$ (CAS Reg. No. 7681-38-1). A preferred sodium bisulfate product is manufactured by Jones-Hamilton Co., 30354 Tracy Road, Walbridge, Ohio 43465. The Jones-Hamilton sodium bisulfate is a dry product comprising crystalline solid particles. The particles have a spherical shape with an average diameter within a range from about 0.03 millimeter to about 1 millimeter. The product is hygroscopic and is readily soluble in water. The product can be safely handled without harm to the skin. It is significantly less expensive than many of the known acidulants.

The Jones-Hamilton sodium bisulfate is also preferred because it is a high quality product with low impurity levels. The product includes sodium bisulfate in an amount within a range of from about 91.5% to about 95.5% by weight (typically about 93%), and sodium sulfate in an amount within a range of from about 4.5% to about 8.5% by weight (typically about 7%). If the product contained less sodium bisulfate, it would not be as effective in lowering pH and imparting a sour flavor to the foods. If the product contained more sodium bisulfate, it could be too tacky and clump up because free sulfuric acid would be present. If this occurred, the product would not flow well, and it would be poorly suited for use in foods such as dry mixes. (In determining the percentage of alkali metal bisulfate in foods according to the invention, only the actual amount of alkali metal bisulfate in the product is included in the calculation, while other materials such as alkali metal sulfate are ignored in the calculation.)

The Jones-Hamilton product is also low in impurities, containing less than 0.003% heavy metals (typically less than 0.0004%), less than about 0.05% water insoluble substances (typically about 0.001%), and less than 0.003% selenium (all measured by weight percent). If the product contained more heavy metals, it could raise concerns about toxicity. If the product contained more water insoluble substances (e.g., specks of dust and other contaminants), it could have an undesirable appearance in foods such as beverages. The product has a moisture content (measured by loss on drying) of less than 0.8% (typically about 0.2%). If the product had a higher moisture content, it could be unsuitable for use in a food such as a dry mix (e.g., a cake mix or a dry beverage mix). The product might not mix well with the other dry ingredients, and the high moisture could cause the sodium bisulfate to become acidic and react prematurely with the other ingredients.

The low impurities and low moisture content of the Jones-Hamilton sodium bisulfate allow it to meet Food Chemicals Codex specifications. The Food and Drug Administration recently issued a letter in which it did not question the conclusion that Jones-Hamilton's sodium bisulfate is generally recognized as safe (GRAS) as an acidulant in foods. It is believed that previous commercial sodium bisulfate products had too many impurities to meet the Food Chemicals Codex specifications. Of course, the present invention is not limited to the use of the Jones-Hamilton sodium bisulfate, but rather it includes any alkali metal bisulfate product suitable for use in foods.

The potassium bisulfate is a potassium salt of sulfuric acid generally expressed as $KHSO_4$ (CAS Reg. No. 7646-93-7).

Advantageously, the use of alkali metal bisulfates as acidulants in foods provides a happy medium between the use of organic acids typically used as acidulants, and the use of common inorganic acids such as sulfuric acid and hydrochloric acid. Typical organic acids are weakly acidic, having a $pK_a$ of about 3–4. Sodium bisulfate is more strongly acidic than most organic acids, having a $pK_a$ of 1.9. As a result, significantly less sodium bisulfate is needed than organic acid to provide a desired pH lowering and/or sour taste. However, sodium bisulfate is weakly acidic compared to the common inorganic acids, such as sulfiric acid and hydrochloric acid. The common inorganic acids, having a $pK_a$ of less than 1, will lower pH very quickly and too much. This can cause harmful effects on the food, such as hydrolysis, flocculation, dispersion, and color and emulsion instability, which are all strongly affected by pH. The amount of common inorganic acid necessary to produce a desired sour taste also lowers the pH too much. While alkali metal bisulfates can be used in conjunction with other food additives, they preferably are not used with hydrochloric acid or sulfuric acid because of the detrimental effect of these acids on foods. Preferably, the food includes no inorganic acids having a $pK_a$ of less than 1.

The alkali metal bisulfates can be used as acidulants in a wide variety of foods. The term "foods", as used herein, includes foods and beverages. The food uses for acidulants are well known to those skilled in the art, and include the following:

Baked goods: Acidulants are used in the leavening system of leavened baked goods, as will be discussed further below. Acidulants also are used for flavoring and for pH lowering in fruit fillings of pies and cakes.

Beverages: Acidulants are used in carbonated beverages, non-carbonated (still) beverages (e.g., fruit juice drinks and nectars), sports drinks, dietetic drinks, wines, beverage powders and gelatin desserts. The acidulants are used for flavoring and pH lowering.

Candies, confectioneries, gelatins, jellies, jams, and preserves: Acidulants are used for flavoring and pH lowering.

Canned fruits and vegetables (including juices): Acidulants are used to reduce the heating necessary for sterilization, and for flavoring.

Dairy products: Acidulants are used for flavoring and for their preservative action.

Meat and seafoods: Acidulants preserve meat and seafoods by retarding rancidity.

Fats and oils: Acidulants help to prevent rancidity and the development of off-flavors.

The alkali metal bisulfate is included in the food in an amount effective to act as an acidulant in the food. Usually, the alkali metal bisulfate is included in an amount within a range of from about 0.01% to about 2.0% by weight of the food. The food ingredients should be thoroughly mixed so that the alkali metal bisulfate is uniformly distributed throughout the food.

The optimum particle size of the alkali metal bisulfate will vary depending on the type of food. Usually, the particles will have an average diameter within a range of from about 0.03 millimeter to about 1 millimeter. If desired, the alkali metal bisulfate can be ground or otherwise processed to reduce the particle size before incorporation into the food, by methods well known to those skilled in the art.

The alkali metal bisulfate is acidic only in aqueous solution. Consequently, for the alkali metal bisulfate to be effective as an acidulant, the food must include sufficient moisture to dissolve the alkali metal bisulfate. The alkali metal bisulfate is hygroscopic and will readily absorb moisture from the other food ingredients.

In a preferred embodiment of the invention, the alkali metal bisulfate is used as an acidulant in the leavening system of a baked good. As is well known to those skilled in the art, the leavening of a baked good is accomplished by liberation of carbon dioxide within the dough or batter during its preparation and in the early stages of baking. The carbon dioxide serves the purpose of lightening the baked good, giving it a finer, smoother texture and increasing its volume.

The leavening system includes alkali metal bisulfate and an alkaline substance capable of releasing carbon dioxide upon reaction with the alkali metal bisulfate. Usually, the alkaline substance is a baking bicarbonate, preferably an alkali metal bicarbonate, i.e., sodium bicarbonate, potassium bicarbonate, ammonium bicarbonate, calcium bicarbonate, magnesium bicarbonate, lithium bicarbonate, or a mixture thereof.

The alkali metal bisulfate can be used as an acidulant in the leavening system of a variety of baked goods including, for example, cakes, quick breads, muffins, biscuits, pancakes, waffles, and the like, which require the generation of carbon dioxide in order to "rise" when they are baked. Preferably, the alkali metal bisulfate is included in an amount within a range of from about 0.1% to about 1.0% by weight of the baked good.

As will be described below, it has been discovered that the particle size of the alkali metal bisulfate is important for providing an optimum product in some baked goods. When used in the leavening system of a baked good, preferably the alkali metal bisulfate is finely ground so that the particles have an average diameter within a range of from about 0.03 millimeter to about 0.2 millimeter.

Basic Yellow Cakes

Basic yellow cakes were prepared using sodium bisulfate as the acidulant in the leavening system. Specifically, the leavening system included sodium bisulfate and sodium bicarbonate. Alternatively, the cakes could be prepared using potassium bisulfate as the acidulant. Each of the cakes using sodium bisulfate as the acidulant was prepared as follows:

| Ingredients | Weight |
|---|---|
| cake flour | 293 grams |
| sugar (granulated) | 346 grams |
| sodium bisulfate | 7 grams |
| sodium bicarbonate | 5 grams |
| salt | 6 grams |
| milk (skim) | 305 grams |

| Ingredients | Weight |
| --- | --- |
| shortening (Crisco) | 75.5 grams |
| water | 55.9 grams |
| eggs (mixed) | 156 grams |
| vanilla extract | 3 grams |

The flour, sugar, sodium bisulfate, sodium bicarbonate and salt were combined in a mixing bowl. Next, 188 grams of the milk and the shortening were added to the mixing bowl. These ingredients were mixed in a Hobart Kitchen Aid mixer at #2 speed for 2 minutes, using a paddle to aid the mixing. Then, the eggs, 117 grams of the milk, and the vanilla extract were added to the mixing bowl. The ingredients were mixed at #3 speed for 2 more minutes to form a batter. The batter (1145 grams) was poured into a greased and floured (13×9×2-inch) pan and baked in a preheated oven at 350° F. for 35 minutes.

For purposes of comparison, control cakes were prepared using baking powder as the leavening system. The baking powder contained sodium bicarbonate, tartaric acid and cornstarch. Each of the control cakes was prepared as follows:

| Ingredients | Weight |
| --- | --- |
| cake flour | 293 grams |
| sugar (granulated) | 346 grams |
| baking powder | 12 grams |
| salt | 6 grams |
| milk (skim) | 305 grams |
| shortening (Crisco) | 151 grams |
| eggs (mixed) | 156 grams |
| milk (skim) | 117 grams |
| vanilla extract | 3 grams |

The flour, sugar, baking powder and salt were combined in a mixing bowl. Next, 188 grams of the milk and the shortening were added to the mixing bowl. These ingredients were mixed in a Hobart Kitchen Aid mixer at #2 speed for 2 minutes, using a paddle to aid the mixing. Then, the eggs, 117 grams of the milk, and the vanilla extract were added to the mixing bowl. The ingredients were mixed at #3 speed for 2 more minutes to form a batter. The batter (1145 grams) was poured into a greased and floured (13×9×2-inch) pan and baked in a preheated oven at 350° F. for 35 minutes.

The cakes using sodium bisulfate as the acidulant, and the control cakes, were tasted for flavor, and were observed for height, texture, and crumb structure. Sensory testing concluded that the flavor was very good in both types of cake. The cakes using sodium bisulfate as the acidulant were found to have a lighter, cleaner and slightly citrus-like taste with no off-flavors when compared to the control cakes. This flavor improvement was not expected beforehand. Both types of cake were of equal height, texture and crumb structure.

The cakes using sodium bisulfate as the acidulant were prepared using both finely ground leavening components (sodium bisulfate and sodium bicarbonate) and leavening components having a larger particle size. The particles of the finely ground leavening components had an average diameter of 0.1 millimeter, while the larger particle size leavening components had an average diameter of 0.74 millimeter. The cakes prepared with finely ground leavening components produced good results in terms of surface appearance. The larger particle size leavening components produced black specks (sodium bisulfate) and brown surface flock (sodium bicarbonate). It was concluded that the cakes should be prepared using finely ground leavening components.

Frostings and Glazes Sodium bisulfate or potassium bisulfate can be used as the acidulant in frostings and glazes. A ready-to-spread frosting using sodium bisulfate is prepared as follows:

| Ingredients | Weight % |
| --- | --- |
| powdered sugar | 45%–55% |
| shortening | 11%–21% |
| water | 11%–21% |
| corn syrup | 3%–11% |
| cocoa | 3%–6% |
| salt | 0.1%–1% |
| potassium sorbate | 0.1%–0.3% |
| sodium bisulfate | 0.1%–0.4% |

The ingredients are processed in a conventional manner to make the ready-to-spread frosting. The sodium bisulfate should be added to frostings and glazes in an amount sufficient to reduce the pH to 5.5 or below.

Pie Fillings

Sodium bisulfate or potassium bisulfate can be used as the acidulant in pie fillings. A pie filling using sodium bisulfate is prepared as follows:

| Ingredients | Weight % of Dry Mix |
| --- | --- |
| sucrose | 85%–89% |
| starch | 7%–11% |
| sodium bisulfate | 0.5%–3% |
| sodium citrate | 0.5%–3% |
| color and flavor | as desired |

The dry mix is combined with milk and/or water, and the ingredients are processed in a conventional manner to make the pie filling.

Starch Candies

Sodium bisulfate or potassium bisulfate can be used as the acidulant in starch candies. A starch candy using sodium bisulfate is prepared as follows:

| Ingredients | Weight |
| --- | --- |
| sugar | 0.9–1.1 kilograms |
| corn syrup | 1.0–1.1 kilograms |
| water | 1.3–1.5 kilograms |
| cream of tartar | 4–6 grams |
| boiling starch | 0.25–0.28 kilograms in 8 kilograms of water |
| sodium bisulfate | 4–8 grams |
| color and flavor | as desired |

The ingredients are processed in a conventional manner to make the starch candy.

Jellies and Jams

Sodium bisulfate or potassium bisulfate can be used as the acidulant in jellies and jams. A grape jelly using sodium bisulfate is prepared as follows:

| Ingredients | Weight |
| --- | --- |
| grape juice | 0.9–1.1 kilograms |
| citrus pectin | 5–7 grams |
| sugar | 1.2–1.3 kilograms |
| 25% sodium bisulfate solution | add until pH is 3.0–3.2 |

The ingredients are processed in a conventional manner to make the grape jelly.

Gelatin Desserts

Sodium bisulfate or potassium bisulfate can be used as the acidulant in gelatin desserts. A gelatin dessert using sodium bisulfate is prepared as follows:

| Ingredients | Weight % of Dry Mix |
| --- | --- |
| sucrose | 85–89% |
| gelatin | 8–10% |
| sodium bisulfate | 1–2% |
| sodium citrate | 0.5–1.5% |
| color and flavor | as desired |

The ingredients are processed in a conventional manner to make the gelatin dessert.

Low Calorie Salad Dressings

Sodium bisulfate or potassium bisulfate can be used as the acidulant in low calorie salad dressings. A low calorie salad dressing using sodium bisulfate is prepared as follows:

| Ingredients | Weight |
| --- | --- |
| powdered vinegar | 15–20 grams |
| crystalline fructose | 10–15 grams |
| salt | 11–13 grams |
| sugar | 10–12 grams |
| sweet dairy whey | 11–13 grams |
| blend of spices | 8–10 grams |
| thickening agent | 5–7 grams |
| sodium bisulfate | 3–5 grams |
| xanthan | 0.5–1.5 grams |
| guar | 0.5–1.5 grams |
| dehydrated parsley | 0.2–0.4 gram |
| titanium dioxide | 0.2–0.4 gram |

The ingredients are combined with 1 cup of water and 1 cup of skim milk, mixed well, and refrigerated for at least 1 hour.

Beverages

Sodium bisulfate or potassium bisulfate can be used as the acidulant in beverages, including still beverages, carbonated beverages, sports drinks, and dietetic drinks. A lemonade beverage using sodium bisulfate is prepared from the following dry mix ingredients:

| Ingredients | Weight |
| --- | --- |
| sucrose | 100–120 grams |
| sodium bisulfate | 2–4 grams |
| calcium phosphate | 1–2 grams |
| titanium dioxide | 0.2 gram |
| FD&C yellow powder | 0.01 gram |

The dry mix ingredients are added to 1000 grams of water, and mixed until dissolved.

Ketchups and Barbecue Sauces

Sodium bisulfate or potassium bisulfate can be used as the acidulant in ketchups and barbecue sauces. For example, a ketchup is prepared by adding sodium bisulfate at 0.2% to 1.0% (by weight) of the ketchup mix to produce a. pH of 3 to 4. A barbecue sauce is prepared by adding sodium bisulfate at 0.2% to 1.0% (by weight) of the barbecue sauce to produce a pH of 2 to 4.

Wheat and Corn Flour Tortillas

Sodium bisulfate or potassium bisulfate can be used as the acidulant in wheat and corn flour tortillas. Antimicrobials added to tortillas to preserve freshness work most efficiently at pH 5.5 to 5.8. The sodium bisulfate or potassium bisulfate is added at 0.1% to 0.5% of flour weight to produce the desired pH.

Canned Vegetables

Sodium bisulfate or potassium bisulfate can be used as the acidulant in canned vegetables such as beans, beets, broccoli, cabbage, carrots, mushrooms, peas, potatoes, spinach, tomatoes and turnips. The sodium bisulfate or potassium bisulfate is added in an amount sufficient to reduce the pH of the canned vegetable to 4.5 or below.

The principle and mode of operation of this invention have been explained in its preferred embodiments. However, it must be understood that this invention may be practiced otherwise than as specifically explained without departing from its spirit or scope.

What is claimed is:

1. A food composition comprising a food including potassium bisulfate added in an amount effective to act as an acidulant in the food, the added potassium bisulfate containing less than 0.003% heavy metals, less than 0.05% water insoluble substances and less than 0.003% selenium by weight, and the food further including moisture in an amount effective to dissolve the potassium bisulfate.

2. The food composition defined in claim 1 wherein the food excludes sulfuric acid and hydrochloric acid.

3. The food composition defined in claim 1 wherein the potassium bisulfate is added in an amount within a range of from about 0.01% to about 2.0% by weight of the food.

4. The food composition defined in claim 1 wherein the food is a beverage and the potassium bisulfate is added in an amount effective to enhance the flavor of the beverage.

5. A food composition comprising a food including potassium bisulfate added in an amount effective to act as an acidulant in the food, the added potassium bisulfate having a moisture content of less than 0.8% by weight, and the added potassium bisulfate containing less than 0.003% heavy metals, less than 0.05% water insoluble substances and less than 0.003% selenium by weight, and the food further including moisture in an amount effective to dissolve the potassium bisulfate.

6. The food composition defined in claim 5 wherein the potassium bisulfate is added in an amount within a range of from about 0.01% to about 2.0% by weight of the food.

7. The food composition defined in claim 5 wherein the food is a beverage and the potassium bisulfate is added in an amount effective to enhance the flavor of the beverage.

8. A food composition comprising a food including potassium bisulfate added in an amount effective to act as an acidulant in the food, the added potassium bisulfate having a moisture content of less than 0.8% by weight, and the added potassium bisulfate containing less than 0.003% heavy metals, less than 0.05% water insoluble substances and less than 0.003% selenium by weight, the food further including moisture in an amount effective to dissolve the potassium bisulfate, and the food excluding sulfuric acid and hydrochloric acid.

9. The food composition defined in claim 8 wherein the potassium bisulfate is added in an amount within a range of from about 0.01% to about 2.0% by weight of the food.

10. The food composition defined in claim 8 wherein the food is a beverage and the potassium bisulfate is added in an amount effective to enhance the flavor of the beverage.

* * * * *